(12) United States Patent
Thompson et al.

(10) Patent No.: US 9,927,592 B2
(45) Date of Patent: Mar. 27, 2018

(54) CABLE ENCLOSURE SYSTEMS, PLUGS AND METHODS FOR USING THE SAME

(71) Applicant: CommScope Technologies LLC, Hickory, NC (US)

(72) Inventors: Roy Keller Thompson, Apex, NC (US); Thomas Ross Marmon, Angier, NC (US); Julian S. Mullaney, Raleigh, NC (US); William Alan Carrico, Raleigh, NC (US); Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/269,596

(22) Filed: Sep. 19, 2016

(65) Prior Publication Data

US 2017/0068065 A1    Mar. 9, 2017

Related U.S. Application Data

(63) Continuation of application No. 14/542,392, filed on Nov. 14, 2014, now Pat. No. 9,450,393, which is a continuation of application No. 13/159,495, filed on Jun. 14, 2011, now Pat. No. 8,917,966.

(60) Provisional application No. 61/354,904, filed on Jun. 15, 2010.

(51) Int. Cl.
G02B 6/44   (2006.01)
H02G 15/007   (2006.01)
G02B 6/38   (2006.01)

(52) U.S. Cl.
CPC ......... *G02B 6/4471* (2013.01); *G02B 6/4444* (2013.01); *G02B 6/4446* (2013.01); *G02B 6/4477* (2013.01); *G02B 6/4478* (2013.01); *H02G 15/007* (2013.01); *G02B 6/3887* (2013.01); *Y10T 29/49948* (2015.01)

(58) Field of Classification Search
None
See application file for complete search history.

(56) References Cited

U.S. PATENT DOCUMENTS

| | | | | |
|---|---|---|---|---|
| 6,269,214 B1 * | 7/2001 | Naudin | ............... | G02B 6/4446 385/135 |
| 8,313,250 B2 * | 11/2012 | Drouard | ............... | G02B 6/4477 174/520 |

* cited by examiner

*Primary Examiner* — Mike Stahl
(74) *Attorney, Agent, or Firm* — Merchant & Gould P.C.

(57) ABSTRACT

An enclosure system for receiving a cable includes an enclosure having an inner chamber and an open position exposing the inner chamber and a closed position covering the inner chamber. A cable receiving port in a wall of the enclosure extends along a longitudinal axis from outside of the enclosure into the inner chamber. The cable receiving port is configured to receive a cable therein when the cable is advanced axially into the port without rotation of the cable when the enclosure is in the closed position. A mating member is associated with the cable receiving port that limits rotation of the cable when the cable is advanced axially into the port. An axial retention member is associated with the cable receiving port that limits axial movement of the cable out of the port when the cable is advanced axially into the port to a lock position.

18 Claims, 10 Drawing Sheets

CABLE ENCLOSURE SYSTEMS, PLUGS AND METHODS FOR USING THE SAME

RELATED APPLICATION(S)

This application is a continuation of U.S. patent application Ser. No. 14/542,392, filed Nov. 14, 2014, which is a continuation of U.S. patent application Ser. No. 13/159,495 filed on Jun. 14, 2011, titled CABLE ENCLOSURE SYSTEMS, PLUGS AND METHODS FOR USING THE SAME, now issued as U.S. Pat. No. 8,917,966, which claims priority to U.S. Ser. No. 61/354,904, filed on Jun. 15, 2010, the disclosures of which are hereby incorporated herein by reference in their entireties. To the extent appropriate, a claim of priority is made to each of the above disclosed applications.

BACKGROUND OF THE INVENTION

The present invention relates to communication cable systems and, more particularly, to optical fiber clamping systems and methods for clamping optical fibers with the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

In addition to the optical fibers, a typical fiber optic cable may include cable jacketing material, cable strength members and fiber containment tubes. These three basic elements sometimes have different properties, such as different hardnesses, different stiffnesses, and different coefficients of thermal expansion. It may be desirable in many situations to limit or even prevent the cable jacketing and the cable strength members from axial displacement relative to one another, and/or relative to a cable enclosure or other device attached to the cable. A typical situation in which the securing is desired is where an opening has been made in the fiber optic cable for accessing the internal optical fibers, and where a splice enclosure may be installed.

In some existing systems, the securing of the securing of an accessed portion of a fiber optic cable may be achieved by first removing the cable outer jacket in order to expose some length of the strength members of the cable. The securing of the outer cable jacket is typically achieved by mechanically securing the outer cable jacket to a substrate at a location where the cable jacket is intact, i.e., outside of the region of the cable jacket that has been removed. This generally allows a circumferential clamp, such as a hose clamp or the like, to be tightened around the intact outer cable jacket, and then the clamp is attached to a substrate. In some cases, the clamp may be tightened around the full cable jacket and an extending element of the substrate so as to secure the cable outer jacket to the substrate. The cable strength element(s) are typically clamped in another clamp device, which is also attached to the substrate. This clamping may be achieved by various arrangements of screw actuated clamps and the like in order to bind down on and exert high forces upon the generally more rigid and harder strength member material. Thus, in combination, the clamping of the intact outer cable sheath to the substrate, and the clamping of the protruding exposed strength member(s) to the substrate can limit or even prevent displacement between the two, and can also serve as a means to jointly anchor the two to a device, such as a splice closure.

Generally, one reason for using two clamping mechanisms for the outer cable sheath and the strength members is that the cable jacket is relatively soft and, thus, usually requires a circumferential clamp that spreads the load over a surface area so as to avoid excessive point loading on the soft cable jacket material. The strength members are usually very hard materials, such as fiber glass or steel, and generally require much higher point loading to secure them sufficiently.

SUMMARY OF THE INVENTION

According to some embodiments of the present invention, an enclosure system for receiving a cable includes an enclosure having an inner chamber and an open position exposing the inner chamber and a closed position covering the inner chamber. A cable receiving port in a wall of the enclosure extends along a longitudinal axis from outside of the enclosure into the inner chamber. The cable receiving port is configured to receive a cable therein when the cable is advanced axially into the port without rotation of the cable when the enclosure is in the closed position. A mating member is associated with the cable receiving port that limits rotation of the cable when the cable is advanced axially into the port. An axial retention member is associated with the cable receiving port that limits axial movement of the cable out of the port when the cable is advanced axially into the port to a lock position.

In yet other embodiments, cable plugs for use with a cable to be inserted in an enclosure include a body member configured to receive the cable therein and having a sealing portion that is configured to form an environmental seal with a cable receiving port of the enclosure when the cable is advanced axially into the port. The cable plugs further included an anti-rotation member and an engagement member. The anti-rotation member is configured to mate with a mating member associated with the cable receiving port to limit rotation of the cable when the cable is advanced axially into the port. The engagement member is configured to mate with an axial retention member associated with the cable receiving port when the cable is advanced axially into the port to the lock position to limit axial movement of the cable out of the port.

In yet other embodiments, methods of inserting a cable into an enclosure include surrounding at least a portion of a section of the cable with a cable plug having an anti-rotation member and an engagement member. The cable plug with the portion of the cable therein is inserted axially into a cable receiving port of an enclosure to a lock position without rotating the cable plug or the cable. In the lock position, the portion of the cable extends into an inner chamber of the enclosure, the cable plug forms an environmental seal with the cable receiving port, the anti-rotation member mates with a mating member associated with the cable receiving port to limit rotation of the cable plug and the engagement member mates with an axial retention member associated with the cable receiving port to limit axial movement of the cable plug and the cable out of the cable receiving port.

DETAILED DESCRIPTION OF EMBODIMENTS OF THE INVENTION

Figure 1:
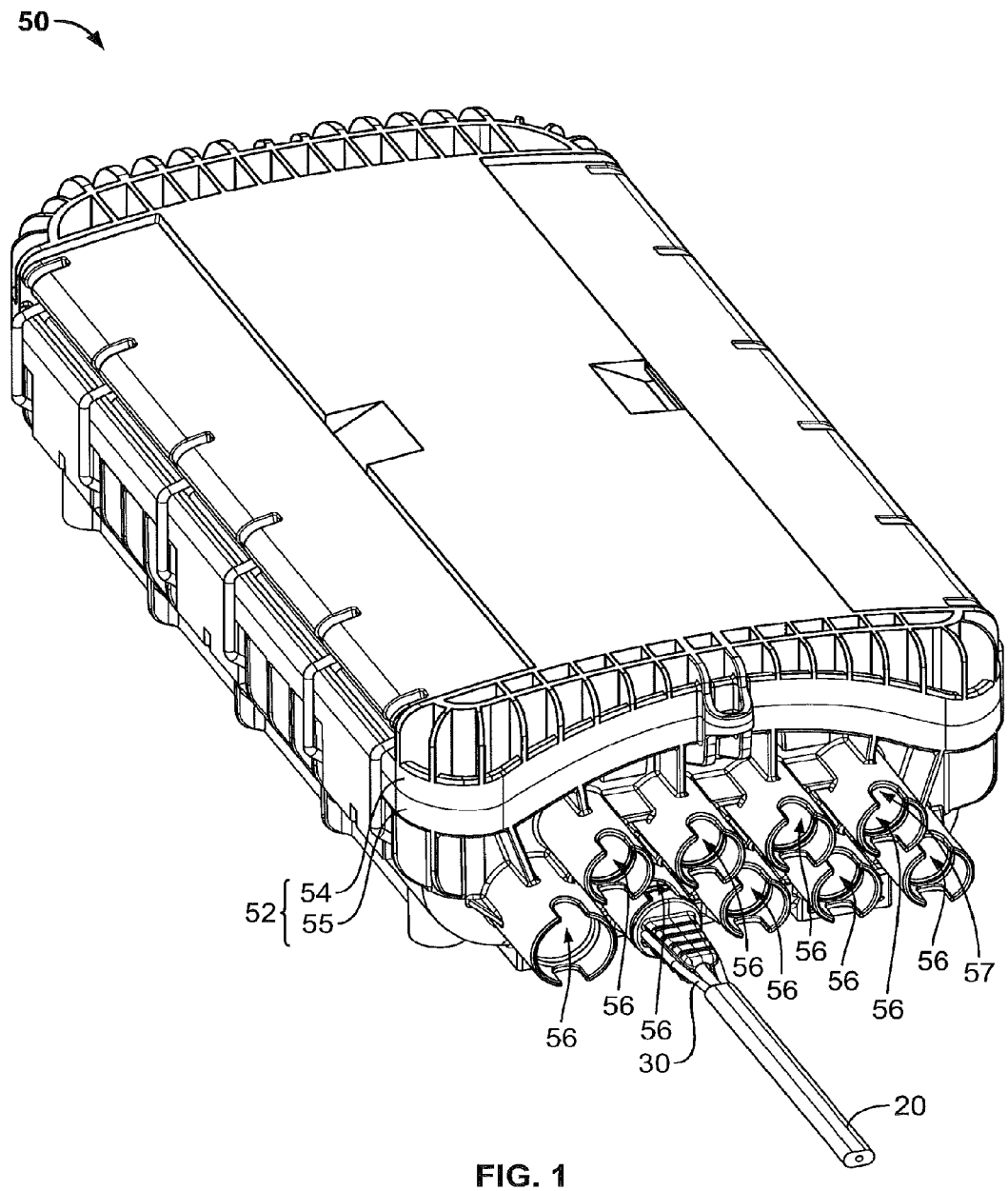
FIG. 1 is a perspective view of an enclosure system according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "overt" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

The description below references enclosing a portion of a fiber optic cable to a closure device and securing the closure device with respect to the cable portion. The referenced fiber optic cables may include multiple optical fiber ribbons, a buffer tube, strength members, a jacket and a metal shield layer; however, according to other embodiments, fiber optic cables of other constructions (e.g., a fiber optic cable not having a metal shield layer) may be used with embodiments of the present invention.

As will be described further herein, some embodiments of the present invention provide an enclosure system for use with fiber optic cabling. The enclosure system may make it easier, for example, to access and splice fibers running to living units or other customer locations.

In some embodiments, the closure system includes an enclosure including some and/or all of the following features. The closure system may include an enclosure containing two or more entry and/or egress points for fiber optic cables. The entry points may be used, for example, for an entering cable(s) (feeder), for exiting drop cable(s) and/or for exiting feeder (express) cable(s). In some embodiments, the enclosure has an opening through which a splicer can access the internal area of the enclosure and perform splicing functions on various fibers. In some embodiments the enclosure includes port(s) configured to receiving mating plug(s), each of which may allow one or more fiber optic cables to enter/exit the enclosure such that the cable(s) may be removed and re-inserted, while limiting or even preventing unwanted rotation and/or axial displacement of the plug(s) relative to the enclosure.

Figure 2:
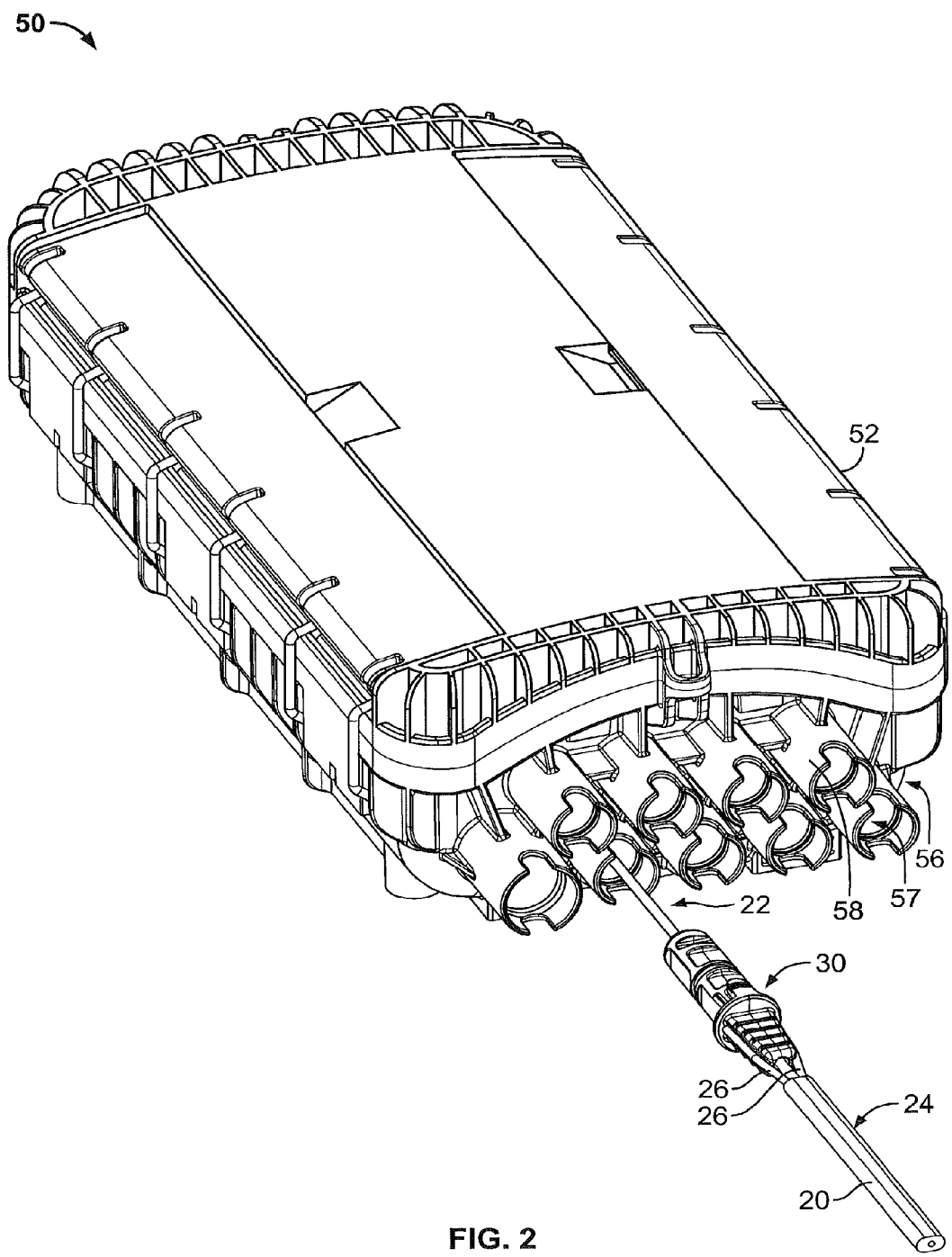
FIG. 2 is a perspective view of a portion of the enclosure system of FIG. 1.
Figure 3:
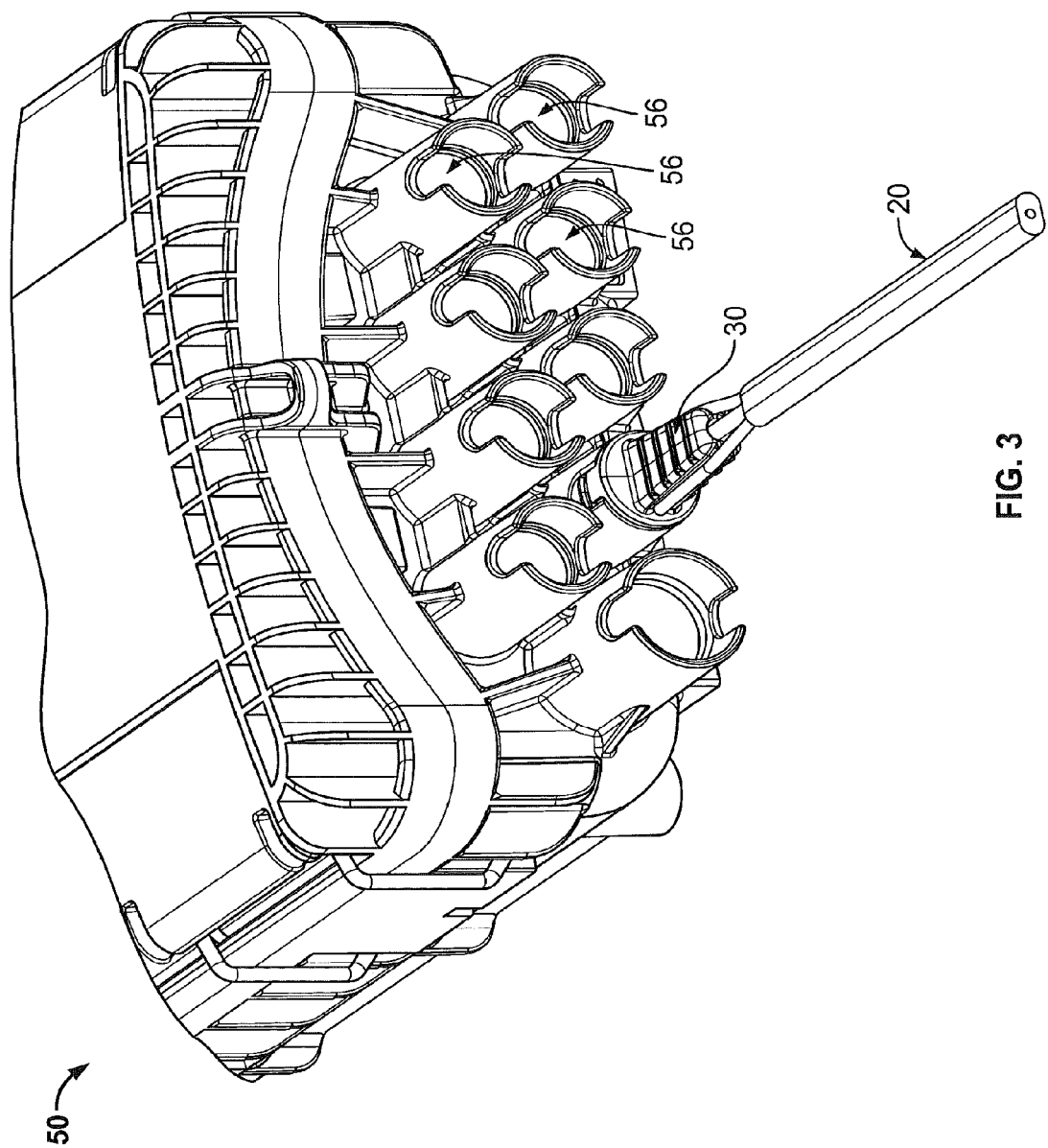
FIG. 3 is a partially exploded view of the enclosure system of FIG. 1.
Figure 4:
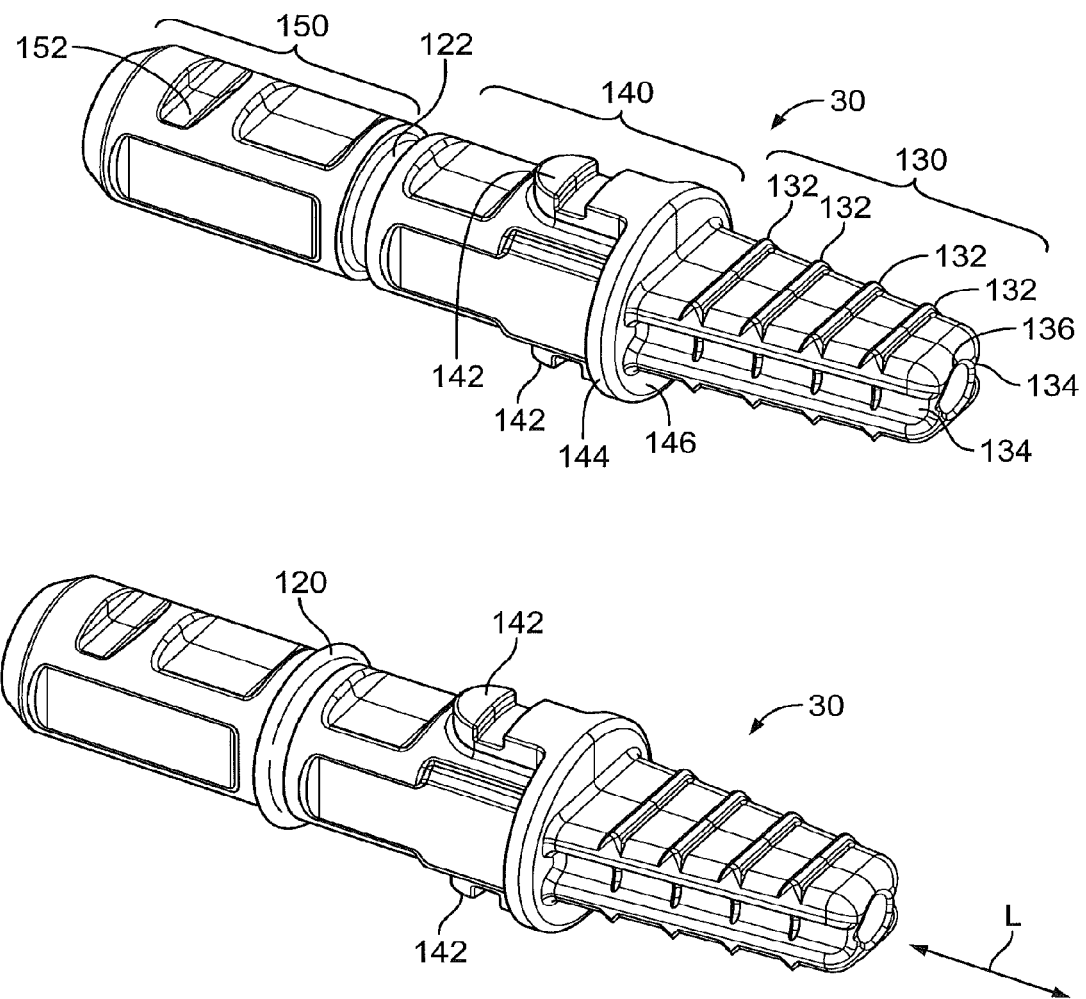
FIG. 4 is a perspective view of the plug shown in the embodiments of FIG. 3 with an O-ring attached and without an O-ring.
Figure 5:
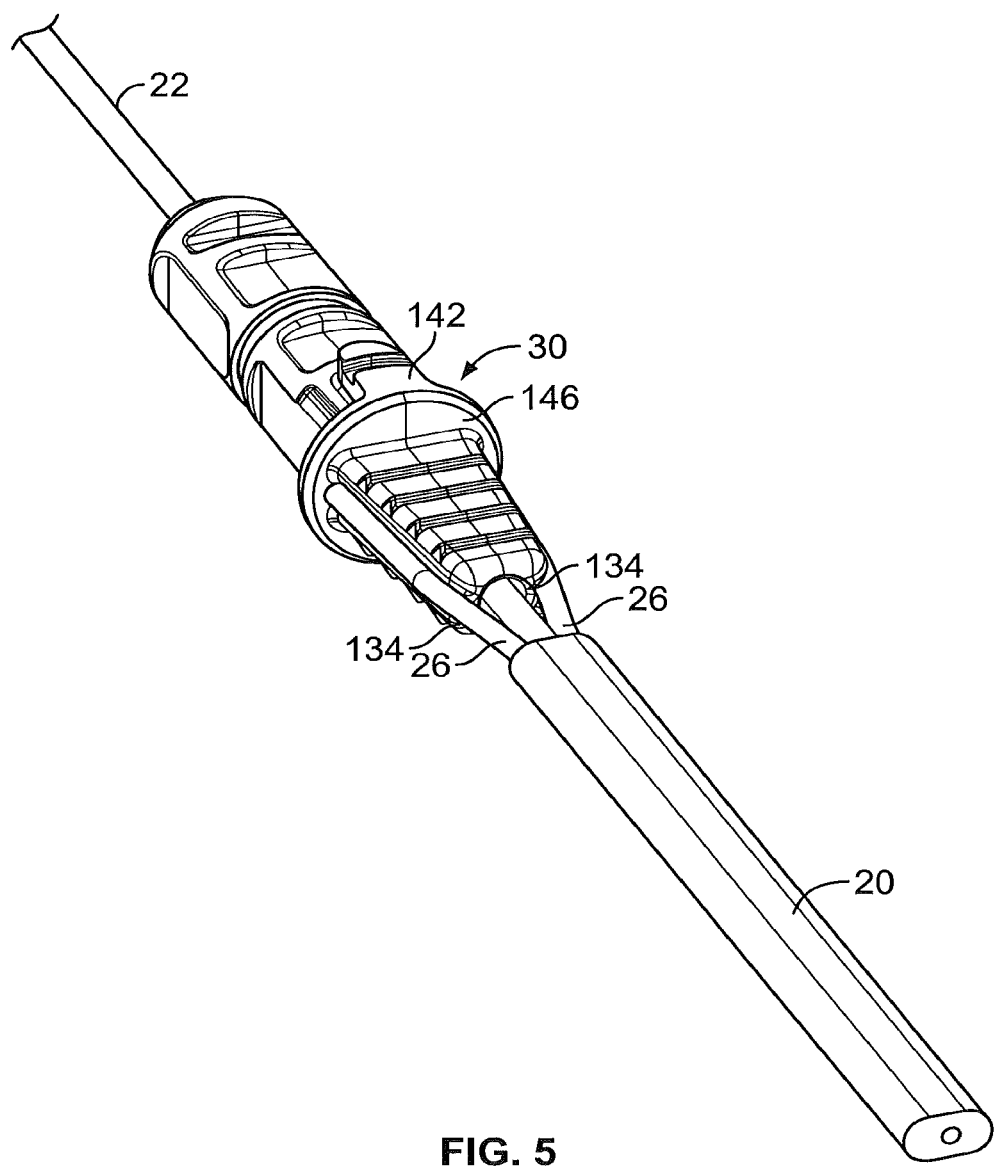
FIG. 5 is a perspective view of the plug shown in the embodiments of FIG. 4 on a fiber optic cable.
Figure 6:
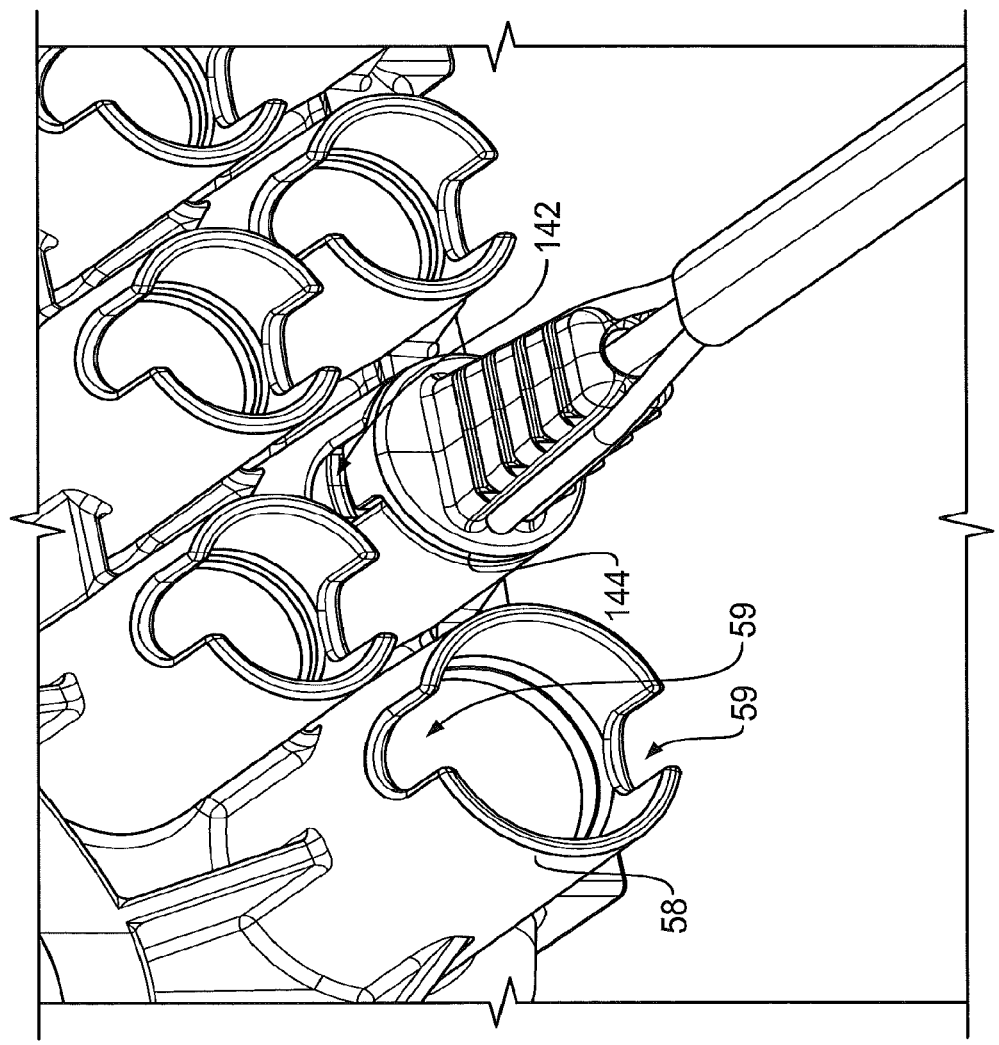
FIG. 6 is a perspective view of a portion of the enclosure system of FIG. 1.
Figure 7:
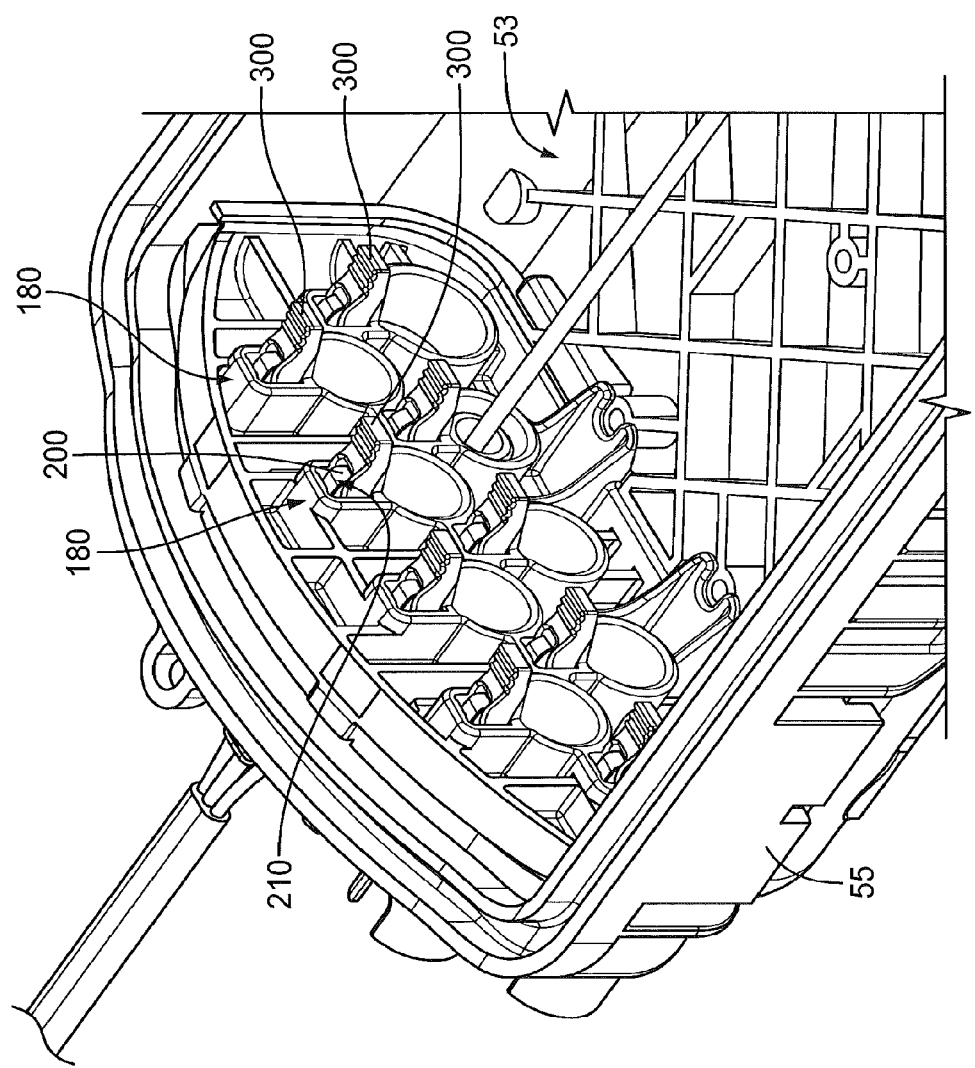
FIG. 7 is a perspective view of a portion of the enclosure system of FIG. 1.
Figure 8:
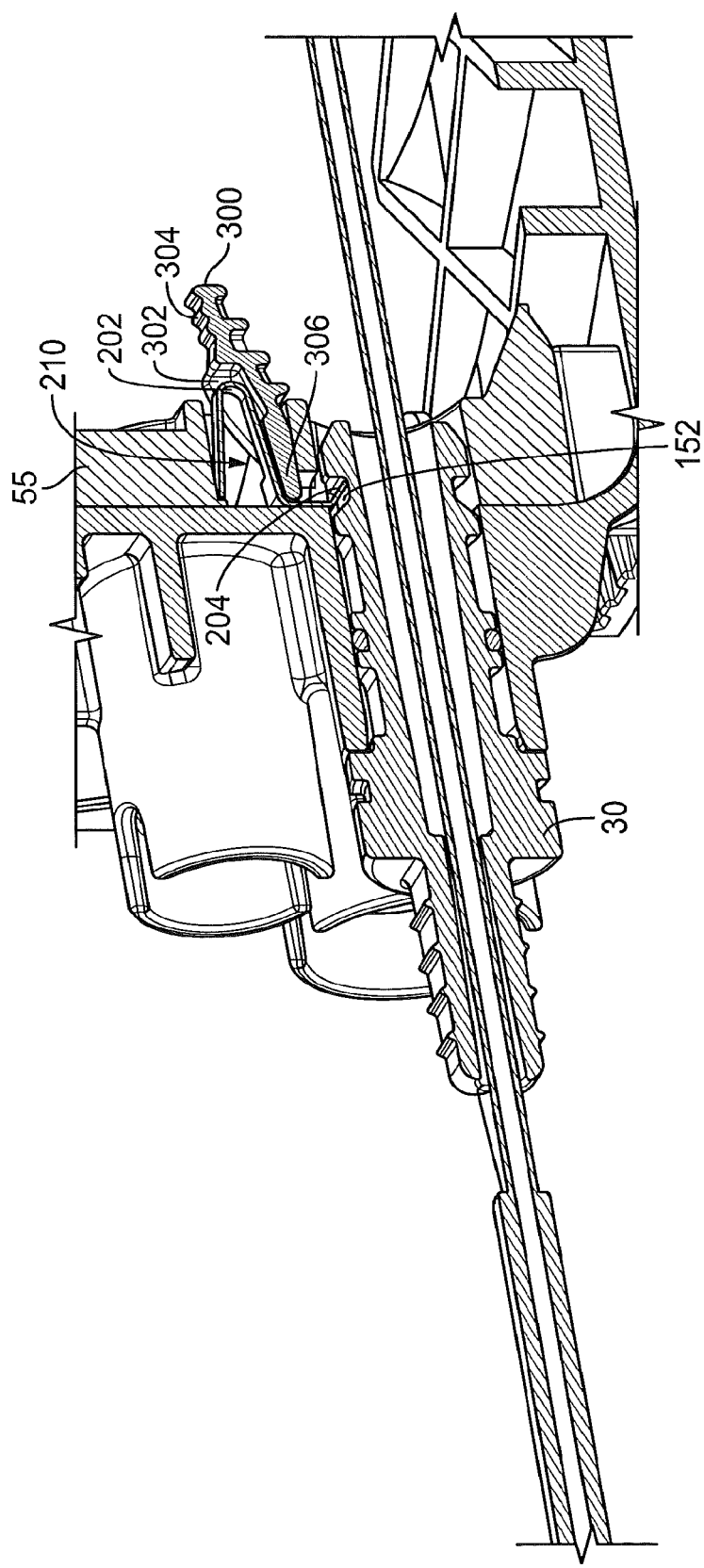
FIGS. 8 and 9 are cross-sectional views of a portion of the enclosure system of FIG. 1 with a plug therein in a first position engaged with a retention spring.
Figure 9:
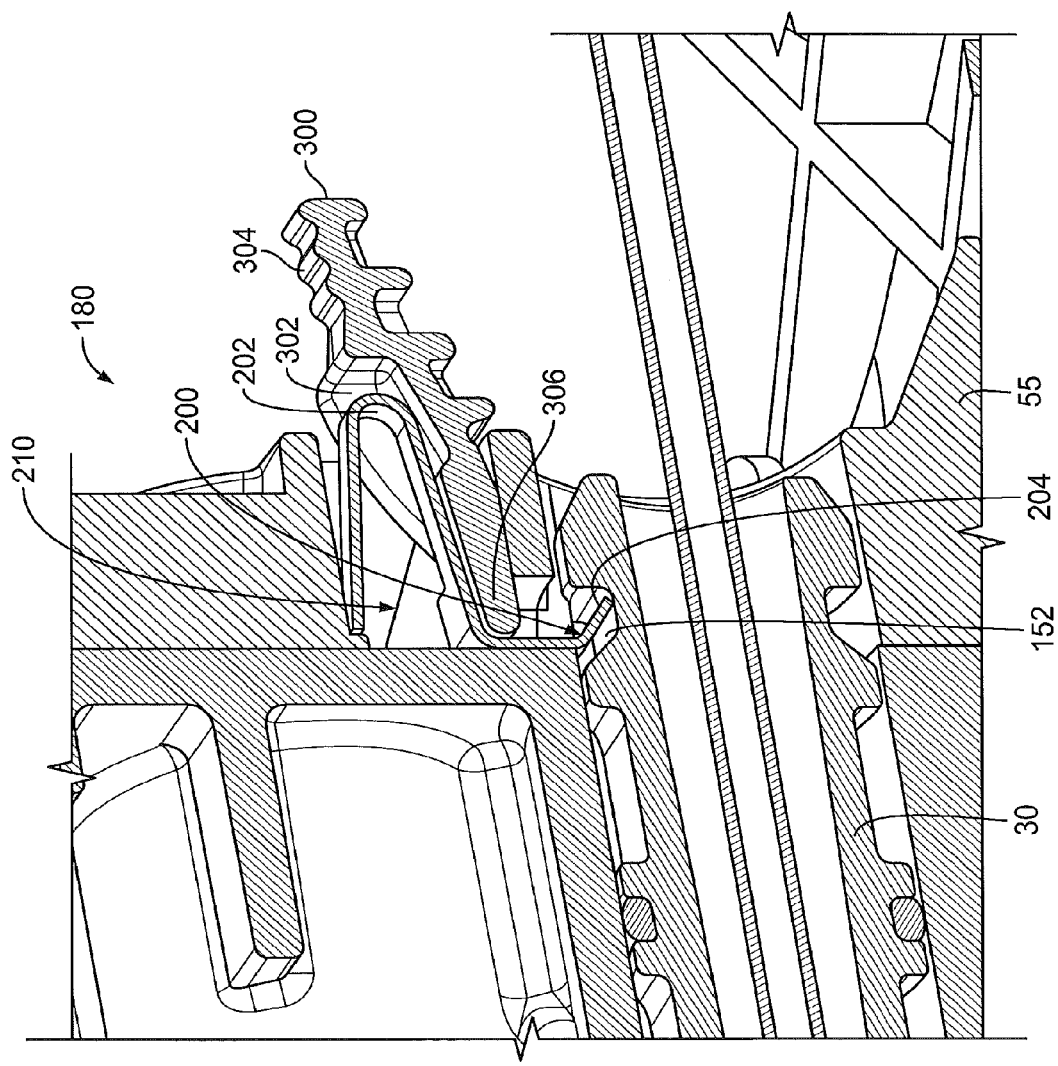
Figure 10:
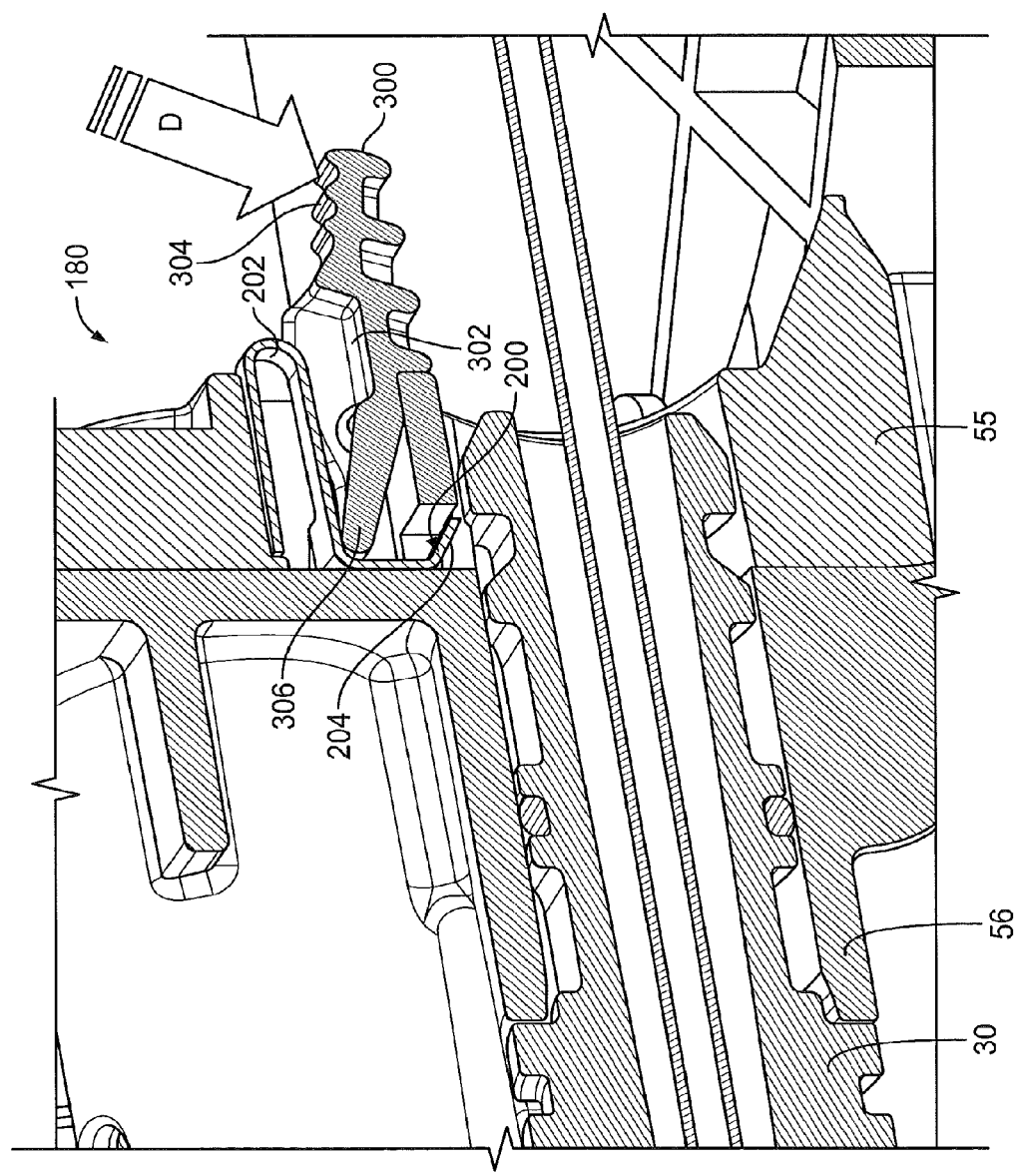
FIG. 10 is a cross-sectional view of the portion of the enclosure system of FIG. 1 with the plug therein in a second position not engaged with the retention spring.

Embodiments of the present invention will be described with reference to the attached figures. FIG. 1 is a perspective view of an enclosure system according to some embodiments of the present invention. FIG. 2 is a perspective view of a portion of the enclosure system of FIG. 1. FIG. 3 is a partially exploded view of the enclosure system of FIG. 1. FIG. 4 is a perspective view of the plug shown in the embodiments of FIG. 3 with an O-ring attached and without an O-ring. FIG. 5 is a perspective view of the plug shown in the embodiments of FIG. 4 on a fiber optic cable. FIG. 6 is a perspective view of a portion of the enclosure system of FIG. 1. FIG. 7 is a perspective view of a portion of the enclosure system of FIG. 1. FIGS. 8 and 9 are cross-sectional views of a portion of the enclosure system of FIG. 1 with a plug therein in a first position engaged with a retention spring. FIG. 10 is a cross-sectional view of the portion of the enclosure system of FIG. 1 with the plug therein in a second position not engaged with the retention spring.

FIGS. 1-3 illustrate embodiments of an enclosure system 50 including an enclosure 52 and a fiber optic cable 20 with a plug 30 on the end thereof inserted in a port 56 of the enclosure 52. While embodiments of the present invention will be described herein with reference to a fiber optic cable 20, it will be understood that the present invention may be used with other types of cable that may be inserted into an enclosure. The enclosure 52 includes a cover member 54 and a base member 55 that define an enclosed splice chamber 53 (FIG. 7). The cover member 54 may be rotated or otherwise moved relative to the base member 55 to provide a splice opening into the splice chamber 53 of the enclosure 52. The port(s) 56 in the enclosure 52 are configured to receive the plug 30 and allow the entry or exit of the fiber optic cable 20 and/or its inner components 22 to the enclosed splice chamber 53. For example, the cable 20 may be a flat fiber drop cable as shown in FIGS. 1-3, a central core tube 22, with the optical fiber(s) therein may extend through the plug 30 into the splice chamber, an outer protective jacket 24 of the cable 20 may terminate before entering the plug 30 and strength members 26 of the cable may extend into the plug and terminate therein. As such, the plug 30, shown as a substantially cylindrical plug 30 in FIGS. 1-3, may be affixed to and surround the cable 20 or at least a portion of the cable on a section thereof. For example, as shown in FIGS. 1-3, a section of the central core tube 22 of the cable 20 has the cable plug 30 thereon at an end of the cable with the outer protective jacket 24 of the cable 20 removed to expose the core tube 22 and strength members 26. While in the illustrated embodiments, the cable plug 30 is shown affixed to the core tube 22 without contacting the outer protective jacket 24, it will be understood that the cable plug 30 could further extend axially over a section of the cable 20 including the outer protective jacket 24.

Embodiments of the cable plug 30 will now be further described with reference to FIGS. 4 and 5. As seen in FIGS. 4 and 5, the cylindrical plug 30 may seal to an inner bore (passageway) 57 of the port 56 with a conventional "0" ring 120. It will be understood that, as described herein, the O-ring 120 may slidably and sealingly engage the inner diameter of cable receiving port 56 to form the environmental seal when the cable plug 30 is in the cable receiving port 56 while allowing axial insertion of the cable plug 30 into the cable receiving port 56 without rotation thereof. It will further be understood that, in some embodiments, the environmental sealing between the cable plug 30 and the cable receiving port 56 may be provided without the use of an O-ring.

The cable plug 30 and cable receiving port 56 in some embodiments also have corresponding interlocking geometries which may limit or prevent the rotation of the plug 30 within the port 56 about the longitudinal axis L of the plug 30 once the plug 30 is fully inserted into the port 56 and/or corresponding retention members limiting or even preventing axial movement (along the longitudinal axis L) of the plug 30 relative to the enclosure 52 (i.e., to limit pullout movement of the plug 30) as will be further described.

As seen in FIGS. 4 and 5, the plug 30 includes a first (rear) section 130, a second (intermediate) section 140 and a third (forward) section 150 with an O-ring groove 122 between the second section 140 and the third section 150 that is configured to receive an O-ring seal 120. The first section 130 includes a plurality of grip members 132 that may facilitate manual grasping of the plug 30 during insertion of the plug 30 into the port 56. The first section 130 in the illustrated embodiments of FIG. 4 further includes strength member receiving channels 134 on respective sides thereof that, as seen in FIG. 5, are configured to receive and retain the respective strength members 26 therein. While shown as substantially U-shaped channels in the illustrated embodiments, it will be understood that the channels 134 may be partially or entirely enclosed passageways sized to receive the strength members 26 enclosed therein. The strength members 26 are shown as abutting a front face 146 of the second section 140 in FIG. 5, which may provide for use of the front face 146 as a fixed axial stop point for the strength members 26 to limit or even prevent the strength members 26 from passing into the inner chamber 53. It will be understood, however, while not shown in the figures, that a coupling member may be provided with the plug 30 to mechanically fix the strength members 26 to the plug and/or the strength members may be passed to the enclosure 52, either externally or internally of the plug 30, and be mechanically secured directly to the enclosure 52.

In some embodiments, the strength members 26 and the outer protective jacket 24 are secured to the plug 30 by a heat shrink member, which may have adhesive therein. The heat shrink member may extend from the front face 146 to an axial position extending over a portion of the jacket 24 of the cable 20. When applied, the adhesive may flow over the enclosed surface of the plug 30 and around the strength members 26 in the strength member receiving channels 134 and the core tube 22. As such, the cable 20 may be mechanically coupled and environmentally sealed to the plug 30.

The second section 140 includes the rotation limiting feature as will be described for the illustrated embodiments of FIG. 4. An anti-rotation member, shown as a protrusion 142, extends from a cylindrical portion 144 of the second section. The illustrated cylindrical portion may be sized to have an outer diameter larger than the inner diameter of the passageway 57 of the port 56. As such, contact between the front face of the port 56 and the cylindrical portion 144 may provide a hard stop point limiting further axial insertion of the plug 30 into the port 56. Similarly, the protrusion 142 is shown as having a larger outer diameter than the inner diameter of the passageway 57.

The corresponding mating member 59 of the port 56 that receives the protrusion 142 for some embodiments is shown in FIG. 6. More particularly, a cutaway 59 defined in a wall 58 of the port 56 is sized to allow insertion of the protrusion 142 therein when the plug 30 is inserted into the port 56. For the embodiments illustrated in FIGS. 4-6, two protrusions 142 are provided on respective sides of the plug 30 with corresponding mating cutaways 59 on the respective sides of the port 56 that define a rotational orientation of the plug 30 when inserted in the port 56. Where the cutaways 59 are configured to conformally receive the protrusions 142 (i.e., have a width approaching an interference fit with a width of the protrusions 142), the cutaways may substantially prevent any rotation of the cable plug 30. As the cable 20 or at least a portion thereof is affixed to the cable plug 30, limiting rotation of the cable plug 30 limits rotation of the cable 20.

As discussed above, in some embodiments, the plug 30 and the port 56 also include mating features that may limit or even prevent axial (pullout) movement between plug 30 and port 56 along the axis L of the port 56 once the plug 30 is inserted at least a selected distance into the port 56. More particularly, for the embodiments illustrated in FIGS. 4 and 5, the third section 150 of the plug 30 includes a spring engagement member 152, shown as a slot in FIG. 4. The axial movement limit aspects of some embodiments of the present invention will now be further described with reference to FIGS. 7-10.

As seen in FIGS. 7-10, an end of the port 56 proximate and extending into the splice chamber 53 includes an axial retention member 180. The axial retention member 180 in the illustrated embodiments includes a retention spring 200 and an actuator tab 300. The retention spring 200 is positioned in a chamber 210 in a wall of the base member 55 of the enclosure 52. The illustrated retention spring 200 is a generally V-shaped spring with a retaining tab 204 extending from one end the V-shaped section. As seen in FIGS. 8 and 9, the retaining tab 204 of the retention spring 200 is received in the slot 152 of the third section 150 of the plug 30 when the plug 30 is inserted in the port 56. The base of the V-shape end 202 of the retention spring 202 is received in a channel 302 of the actuator tab 300. As such, as seen in FIG. 10, when the actuator tab 300 is moved in a direction D, for example, by an operator grasping a gripper end 304 of the actuator tab 300 that extends into the chamber 53 and moving the gripper end 304 in the direction D to the position shown in FIG. 9, an opposite, actuation end 306 of the actuator tab 300 compresses the V-shape of the retention spring 200 into a substantially U-shape, thereby removing the retaining tab 204 of the retention spring 200 from the engagement slot 152 of the plug of the plug 30 to allow axial movement and removal of the plug 30 from the port 56. As such, an operator with access to the chamber 53 may manually actuate the actuator tab 300 to remove an installed plug 30 from the enclosure 52.

In some embodiments, the plug 30 may be inserted into the port 56 without actuating the release actuator tab 300. The retention spring 200 as illustrated may have an angled bias allowing the plug 30 to push the retention spring 200 out of the way when being inserted and then to snap into the engagement slot 152 when fully seated in the port 56. The angled bias may prevent the plug 30 from moving the retention spring 200 and limit or even prevent withdrawal of the plug 30 from the port 56 without actuation of the release actuator tab 300.

As described above, some embodiments of the present invention may address two potential problems of fiber optic cable enclosures. The first problem is that, when cables enter an enclosure, they generally must be prevented from rotating about their axes or else damage to the fibers can occur from excessive twisting. As most O-ring seals are usually round, and seal best when they are round, it is advantageous to have a round plug and port in the O-ring sealing area, but then additional means generally is needed to prevent rotation. As described above, the mating features 142, 59 may limit or even prevent rotation. Furthermore, it is generally advantageous to have enclosures configured to have multiple plugs and ports spaced very close to each other so as to have a dense space efficient array of ports. However, when such dense spacing occurs there is generally not sufficient space between the ports to allow threaded retention between the plugs and the ports using conventional threaded ring arrangements because there is not enough finger space between to allow rotation of threaded rings or the like. Such can be seen, for example, in FIG. 1 where the enclosure 52 is shown with nine generally closely positioned ports 56. Therefore an improved method as described above is to provide a plug that is pushed along its axis into the port and to have a snap lock arrangement to perform the function of axial retention. This way the operator can push the plug by gripping the cable further away from the plug itself where there is adequate room for gripping and thrust it into the port to engage the snap lock mechanism. This may allow a much denser array of ports, such as the exemplary array of nine ports seen in FIG. 1, where the spacing between ports is less than an inner diameter of the ports.

As such, some embodiments of the present invention provide an enclosure system that includes a combination of anti-rotation and push-in snap retention and release into one device. With one hand, the operator can insert the plug into the port and achieve pullout and anti-rotation retention without having to actuate any other parts. Such a method of insertion of a fiber optic cable into an enclosure may be carried out while only requiring the use of one hand of the operator. In addition, the illustrated embodiments further provide an improved release mechanism for when the operator wants to withdraw a plug from the port. To do this, a single release tab may be actuated. The foregoing is illustrative of the present invention and is not to be construed as limiting thereof.

In some embodiments, the enclosure system further includes a cable plug. The cable plug includes a body member configured to receive the cable therein and having a sealing portion that is configured to form an environmental seal with the cable receiving port when the cable is advanced axially into the port. The cable plug further includes and anti-rotation member and an engagement member. The anti-rotation member is configured to mate with the mating member associated with the cable receiving port to limit rotation of the cable plug when the cable is advanced axially into the port. The engagement member is configured to mate with the axial retention member associated with the cable receiving port when the cable is advanced axially into the port to the lock position to limit axial movement of the cable out of the port.

In other embodiments, the body member includes a substantially cylindrical portion that is received in the cable receiving port. The cylindrical portion has an outer diameter that is less than an inner diameter of the cable receiving port. The anti-rotation member of the cable plug is a protrusion on the cylindrical portion that has an outer diameter that is greater than the inner diameter of the cable receiving port. The mating member associated with the cable receiving port is a cutaway of the cable receiving port that has an outer diameter greater than the outer diameter of the protrusion. The protrusion is received in the cutaway when the plug is in the lock position to limit rotational movement of the plug. The engagement member is a transverse slot in the cylindrical portion of the body member at an end proximate the inner chamber when the plug is in the cable receiving port.

In further embodiments, the axial retention member includes a retention spring and a manually actuable actuator tab. The retention spring is movably mounted to the enclosure and has an engaged position and a released position. The retention spring has a retaining tab at an end thereof that is positioned to be received in the transverse slot in the body member when the plug is advanced axially into the port to the locked position and the retention spring is in the engaged position to limit axial movement of the plug and cable out of the port. The manually actuable actuator tab is operably coupled to the retention spring and has a first position in which the retention spring is free to move to its engaged position and a second position in which the actuator tab holds the retention spring in its released position with the retaining tab removed from the transverse slot to allow the plug and cable to be moved axially out of the port. In other embodiments, the sealing portion of the body member is an O-ring extending around the cylindrical portion of the body member that slidably and sealingly engages the inner diameter of cable receiving port to form the environmental seal when the plug is in the cable receiving port. The cable may be a fiber optic cable having a lengthwise cable axis and including a plurality of optical fibers, a strength member and a tube surrounding the optical fibers. The body member may be configured to surround the tube and the body member may further include a channel configured to receive and retain the strength member. The channel may include an inner end that is configured to limit movement of the strength member into the inner chamber. The body member may further include a grip member positioned to facilitate manual grasping of the plug during insertion of the plug into the port.

In further embodiments, the cable receiving port has an inner diameter and the enclosure includes a plurality of cable receiving ports in the wall of the enclosure and displaced from each other by a distance less than the inner diameter.

In other embodiments, the axial retention member includes a retention spring and a manually actuable actuator tab. The retention spring is movably mounted to the enclosure and has an engaged position and a released position. The retention spring has a retaining tab at an end thereof that is positioned to be received in an engagement member of a plug surrounding the cable when the cable with the plug thereon is advanced axially into the port to the locked position and the retention spring is in the engaged position to limit axial movement of the plug and cable out of the port. The manually actuable actuator tab is operably coupled to the retention spring and has a first position in which the retention spring is free to move to its engaged position and a second position in which the actuator tab holds the retention spring in its released position with the retaining tab removed from the engagement member to allow the plug and cable to be moved axially out of the port.

In further embodiments, the retention spring is a generally V-shaped spring positioned in a chamber in the wall of the enclosure proximate the cable receiving port. The actuator tab is pivotally coupled to the wall and has a first end in the chamber in the wall and contacting the V-shaped spring and a second, opposite end extending into and accessible from the inner chamber. Rotation of the second end from a rest position to an activated position compresses the V-shaped spring into a substantially U-shape to displace the retaining tab of the retention spring away from a centerline of the cable receiving port. The mating member associated with the cable receiving port may be a cutaway of the cable receiving port configured to receive an anti-rotation member of a plug surrounding the cable when the cable with the plug thereon is advanced axially into the cable receiving port. The enclosure and the actuator tab may be plastic and the retention spring may be metal. The cable receiving port may be a plurality of cable receiving ports in the wall of the enclosure. The chamber in the wall may be a plurality of chambers in the wall associated with respective ones of the cable receiving ports. The plurality of chambers in the wall may be in a removable section of the wall that is positioned in the inner chamber of the enclosure.

In other embodiments, the body member includes a substantially cylindrical portion that is received in the cable receiving port. The cylindrical portion has an outer diameter that is less than an inner diameter of the cable receiving port. The anti-rotation member of the cable plug is a protrusion on the cylindrical portion that has an outer diameter that is greater than the inner diameter of the cable receiving port. The mating member associated with the cable receiving port is a cutaway of the cable receiving port that has an outer diameter greater than the outer diameter of the protrusion. The protrusion is configured to be conformally received in the cutaway when the plug is in the lock position to limit rotational movement of the plug. The engagement member is a transverse slot in the cylindrical portion of the body member at an end proximate an inner chamber of the enclosure when the plug is in the cable receiving port.

In further embodiments of the cable plug, the sealing portion of the body member is an O-ring extending around the cylindrical portion of the body member that slidably and sealingly engages the inner diameter of cable receiving port to form the environmental seal when the plug is in the cable receiving port. The cable may be a fiber optic cable that has a lengthwise cable axis and includes a plurality of optical fibers, a strength member and a tube surrounding the optical fibers. The body member may be configured to surround the tube and the body member may further include a channel configured to receive and retain the strength member. The channel may include an inner end that is configured to limit movement of the strength member into the inner chamber and the body member may further include a grip member positioned to facilitate manual grasping of the plug during insertion of the plug into the port. The cable may be mechanically coupled and environmentally sealed to the plug.

Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An enclosure system for receiving a cable with a cable plug, comprising:
   an enclosure having an inner chamber and an open position exposing the inner chamber and a closed position covering the inner chamber;
   a cable receiving port in a wall of the enclosure and extending along a longitudinal axis from outside of the enclosure into the inner chamber, wherein the cable receiving port is configured to receive a cable therein when the cable is advanced axially into the port without rotation of the cable when the enclosure is in the closed position;
   a mating member associated with the cable receiving port that limits rotation of the cable when the cable is advanced axially into the port; and an axial retention member associated with the cable receiving port that limits axial movement of the cable out of the port when the cable is advanced axially into the port to a lock position, wherein the mating member associated with the cable receiving port includes a cutaway of the cable receiving port, the cutaway configured to receive a protrusion formed on the cable plug when the cable is advanced axially into the port.

2. The enclosure system of claim 1, further comprising a cable plug, wherein the cable plug comprises:
  a body member configured to receive the cable therein and having a sealing portion that is configured to form an environmental seal with the cable receiving port when the cable is advanced axially into the port;
  an anti-rotation member that is configured to mate with the mating member associated with the cable receiving port to limit rotation of the cable plug when the cable is advanced axially into the port; and
  an engagement member that is configured to mate with the axial retention member associated with the cable receiving port when the cable is advanced axially into the port to the lock position to limit axial movement of the cable out of the port.

3. The enclosure system of claim 2, wherein the body member includes a substantially cylindrical portion that is received in the cable receiving port, wherein the cylindrical portion has an outer diameter that is less than an inner diameter of the cable receiving port and wherein the anti-rotation member of the cable plug comprises the protrusion on the cylindrical portion that has an outer diameter that is greater than the inner diameter of the cable receiving port.

4. The enclosure system of claim 3, wherein the axial retention member comprises:
  a retention spring movably mounted to the enclosure having an engaged position and a released position, wherein the retention spring has a retaining tab at an end thereof that is positioned to be received in the transverse slot in the body member when the plug is advanced axially into the port to the lock position and the retention spring is in the engaged position to limit axial movement of the plug and cable out of the port; and
  a manually actuable actuator tab operably coupled to the retention spring and having a first position in which the retention spring is free to move to its engaged position and a second position in which the actuator tab holds the retention spring in its released position with the retaining tab removed from the transverse slot to allow the plug and cable to be moved axially out of the port.

5. The enclosure system of claim 3, wherein the sealing portion of the body member comprises an O-ring extending around the cylindrical portion of the body member that slidably and sealingly engages the inner diameter of cable receiving port to form the environmental seal when the plug is in the cable receiving port.

6. The enclosure system of claim 5, wherein the cable comprises a fiber optic cable, the cable having a lengthwise cable axis and including a plurality of optical fibers, a strength member and a tube surrounding the optical fibers and wherein the body member is configured to surround the tube and the body member further includes a channel configured to receive and retain the strength member.

7. The enclosure system of claim 6, wherein the channel includes an inner end that is configured to limit movement of the strength member into the inner chamber and wherein the body member further comprises a grip member positioned to facilitate manual grasping of the plug during insertion of the plug into the port.

8. The enclosure system of claim 1, wherein the cable receiving port has an inner diameter and wherein the cable receiving port comprises a plurality of cable receiving ports in the wall of the enclosure and displaced from each other by a distance less than the inner diameter.

9. The enclosure system of claim 1, wherein the axial retention member comprises:
  a retention spring movably mounted to the enclosure and having an engaged position and a released position, wherein the retention spring has a retaining tab at an end thereof that is positioned to be received in an engagement member of a plug surrounding the cable when the cable with the plug thereon is advanced axially into the port to the lock position and the retention spring is in the engaged position to limit axial movement of the plug and cable out of the port; and
  a manually actuable actuator tab operably coupled to the retention spring and having a first position in which the retention spring is free to move to its engaged position and a second position in which the actuator tab holds the retention spring in its released position with the retaining tab removed from the engagement member to allow the plug and cable to be moved axially out of the port.

10. The enclosure system of claim 9, wherein the retention spring is a generally V-shaped spring positioned in a chamber in the wall of the enclosure proximate the cable receiving port and wherein the actuator tab is pivotally coupled to the wall and has a first end in the chamber in the wall and contacting the V-shaped spring and a second, opposite end extending into and accessible from the inner chamber, wherein rotation of the second end from a rest position to an activated position compresses the V-shaped spring into a substantially U-shape to displace the retaining tab of the retention spring away from a centerline of the cable receiving port.

11. The enclosure system of claim 10, wherein the mating member associated with the cable receiving port comprises a cutaway of the cable receiving port configured to receive an anti-rotation member of a plug surrounding the cable when the cable with the plug thereon is advanced axially into the cable receiving port.

12. The enclosure system of claim 10, wherein the enclosure and the actuator tab are plastic and the retention spring comprises a metal.

13. The enclosure system of claim 10, wherein the cable receiving port comprises a plurality of cable receiving ports in the wall of the enclosure and wherein the chamber in the wall comprises a plurality of chambers in the wall associated with respective ones of the cable receiving ports, wherein the plurality of chambers in the wall are in a removable section of the wall that is positioned in the inner chamber of the enclosure.

14. A method of inserting a cable into an enclosure, comprising:
  surrounding at least a portion of a section of the cable with a cable plug having an anti-rotation member and an engagement member, wherein the anti-rotation member includes protrusion formed on the cable plug;
  inserting the cable plug with the portion of the cable therein axially into a cable receiving port of an enclosure to a lock position without rotating the cable plug or the cable, wherein, in the lock position, the portion of the cable extends into an inner chamber of the enclosure, the cable plug forms an environmental seal with the cable receiving port, the anti-rotation member mates with a mating member associated with the cable receiving port to limit rotation of the cable plug and the engagement member mates with an axial retention member associated with the cable receiving port to limit axial movement of the cable plug and the cable out of the cable receiving port, wherein the mating member associated with the cable receiving port includes a cutaway of the cable receiving port, the cutaway configured to receive the protrusion of the cable plug when the cable is advanced axially into the port.

15. The enclosure system of claim 1, wherein the cutaway of the cable receiving port has an outer diameter greater than the outer diameter of the protrusion, and wherein the protrusion is received in the cutaway when the plug is in the lock position to limit rotational movement of the plug.

16. The enclosure system of claim 2, wherein the engagement member comprises a transverse slot in the body member at an end proximate the inner chamber when the plug is in the cable receiving port.

17. The enclosure system of claim 16, wherein the axial retention member comprises:

a retention spring movably mounted to the enclosure having an engaged position and a released position, wherein the retention spring has a retaining tab at an end thereof that is positioned to be received in the transverse slot in the body member when the plug is advanced axially into the port to the lock position and the retention spring is in the engaged position to limit axial movement of the plug and cable out of the port.

18. The enclosure system of claim 1, wherein the axial retention member comprises:

a retention spring movably mounted to the enclosure and having an engaged position and a released position, wherein the retention spring has a retaining tab at an end thereof that is positioned to be received in an engagement member of a plug surrounding the cable when the cable with the plug thereon is advanced axially into the port to the lock position and the retention spring is in the engaged position to limit axial movement of the plug and cable out of the port.

\* \* \* \* \*